(12) United States Patent
Nishimura

(10) Patent No.: US 7,262,800 B2
(45) Date of Patent: Aug. 28, 2007

(54) OPTICAL SENSOR UNIT PROVIDED WITH RADIO OPTICAL SENSOR HAVING RADIO ELEMENT AND RADIO COMMUNICATION MEANS APART FROM THE RADIO OPTICAL SENSOR, OPTICAL SENSOR ARRAY AND METHOD OF DRIVING OPTICAL SENSOR

(75) Inventor: Naoki Nishimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 10/601,712

(22) Filed: Jun. 20, 2003

(65) Prior Publication Data

US 2004/0008992 A1 Jan. 15, 2004

(30) Foreign Application Priority Data

Jun. 28, 2002 (JP) ............................. 2002-190553

(51) Int. Cl.
*H04N 5/335* (2006.01)
*H04N 5/225* (2006.01)

(52) U.S. Cl. .................................. 348/294; 348/207.99

(58) Field of Classification Search ............ 348/207.99, 348/294; 455/556.1, 557
See application file for complete search history.

(56) References Cited

U.S. PATENT DOCUMENTS

| 2004/0201685 A1* | 10/2004 | Seaman et al. ........... 348/207.1 |
| 2004/0208490 A1* | 10/2004 | Akutsu et al. ............... 386/117 |
| 2005/0068416 A1* | 3/2005 | Glukhovsky et al. ......... 348/77 |
| 2006/0050145 A1* | 3/2006 | Tanimoto ..................... 348/68 |
| 2007/0066868 A1* | 3/2007 | Shikii ......................... 600/118 |

* cited by examiner

*Primary Examiner*—Tuan Ho
(74) *Attorney, Agent, or Firm*—Cowan, Liebowitz & Latman, P.C.

(57) ABSTRACT

To provide an optical sensor unit in which the respective optical sensor elements can be easily provided on a curved surface without using wirings, a reduction in image pickup speed due to wiring delay is prevented to improve a photographing speed, and highly sensitive photographing is realized. The optical sensor unit is composed of an image pickup area section in which a large number of radio optical sensors are arranged and a radio communication means located in the vicinity thereof. The radio communication means has an image data signal circuit, a radio transmission circuit connected therewith, and an antenna. Each of the radio optical sensors is composed of an optical sensor element, a radio element, and an antenna.

11 Claims, 12 Drawing Sheets

OPTICAL SENSOR UNIT PROVIDED WITH RADIO OPTICAL SENSOR HAVING RADIO ELEMENT AND RADIO COMMUNICATION MEANS APART FROM THE RADIO OPTICAL SENSOR, OPTICAL SENSOR ARRAY AND METHOD OF DRIVING OPTICAL SENSOR

BACKGROUND OF THE INVENTION

1. Field of the Invention

The present invention relates to an optical sensor unit for performing image photographing using an optical sensor, an optical sensor array, and a method of driving the optical sensor.

2. Related Background Art

In recent years, a digital still camera and a digital video camera have been widely available because they have a characteristic in which a video obtained by photographing can be readily viewed at a photographing location and a characteristic in which an image is stored in a hard disk of a personal computer and can be read using a monitor when necessary. In many cases, an optical sensor mounted to the digital cameras is composed of a solid-state image pickup element of a MOS structure including a metal, oxide, and semiconductor in which photoelectric conversion is made possible. The solid-state image pickup element is classified into an FET type and a CCD type according to an optical carrier moving system. In addition, those types of solid-state image pickup elements are used in various fields such as a copying machine and a scanner in addition to the above-mentioned cameras.

As shown in FIG. 24, the optical sensor includes a large number of optical sensor elements 21 arranged in matrix within an area 24 which receives light related to a video. A driver circuit which is composed of a column circuit 25 and a row circuit 26 transmits/receives signals to/from the respective optical sensor elements 21 through respective wirings 22 and 23, thereby producing the entire image data.

For example, FIG. 25 shows a two-dimensional CMOS area sensor having pixels of two columns and four rows, which is described in the first embodiment in Japanese Patent Application Laid-Open No. 2000-004399. According to a CMOS circuit disclosed in Japanese Patent Application Laid-Open No. 2000-004399, timing signals for image recording are sent from a vertical scanning block circuit and a horizontal scanning block circuit to respective CMOS sensor elements through respective wirings and then pixel signals are read out therefrom. Therefore, the optical sensor represented by the solid-state image pickup element such as a CMOS sensor or a CCD sensor which has been used up to now has a structure in which electrical wirings run in matrix to connect at least two driver circuits with the respective optical sensor elements.

On the other hand, when a 180° or 360° panoramic picture is photographed, it is desirable that the optical sensor elements are formed on a curved substrate. Therefore, it is required that the optical sensor has a structure which is resistant to deformation such as bending. In addition, a use in which an object is photographed as a three-dimensional stereoscopic video and published on Web is increased. In addition, according to the optical sensor which has been used up to now, for example, the optical sensor disclosed in Japanese Patent Application Laid-Open No. 2000-004399 as described above, light sensitivity is uniformly adjusted for the entire substrate.

Because each optical sensor is formed on the same flat substrate, an angle with respect to a subject is constant. Accordingly, when a region wider than the view angle of a wide angle lens is photographed, it is required that images in respective portions are photographed in advance and the photographed images are synthesized.

Also, when a single subject is photographed from different angles, it is necessary to change both the position and the orientation of the optical sensor for photographing as in the above-mentioned case. In addition, synthetic processing is required after the photographing. In the synthetic processing, positioning and sensitivity matching of respective images for keeping the continuity thereof are difficult. Therefore, there is a problem in that the synthetic processing is difficult.

Also, the entire sensitivity is determined in the conventional CCD sensor and the conventional CMOS sensor. Therefore, when a difference between a bright region and dark region in an image is large, it is necessary to adjust the sensitivity to either region. However, in this case, there arises the following problem. When the sensitivity is adjusted to the bright region, the dark region is difficult to view. When the sensitivity is adjusted to the dark region, the bright region uniformly becomes white.

SUMMARY OF THE INVENTION

The present invention has been made in view of the above-mentioned problems, and an object of the present invention is to provide an optical sensor unit with high reliability in which the respective optical sensor elements can be easily provided on a curved surface without using wirings, a reduction in image pickup speed due to wiring delay is prevented to improve a photographing speed, and highly sensitive photographing is realized, an optical sensor array of the optical sensor unit, and a method of driving an optical sensor.

According to one aspect of the present invention, an optical sensor unit includes: a plurality of radio optical sensor means each including an optical sensor and a radio element for transmitting and receiving of an information through communication with the optical sensor to and from an outside by radio; and radio communication means for transmitting and receiving an electromagnetic wave as a radio signal to and from the radio elements, which is located in a region apart from the radio elements, and in the optical sensor unit: the radio communication means transmits to each of the radio elements an electromagnetic wave as a signal for requesting transmission of photographing information and an electromagnetic wave for supplying energy for photographing by the optical sensor and radio transmission and reception by the radio elements; and each of the radio optical sensor means receives the electromagnetic waves and transmits photographing information of a subject from the optical sensor to the radio communication means through the radio element.

In further another aspect of the optical sensor unit, each of the radio optical sensor means is provided on a curved substrate and adapted to photograph the subject at different angles.

In further another aspect of the optical sensor unit, each of the radio optical sensor means is provided on a cylindrical substrate and adapted to photograph a 360° image along a circumference of a cross section of the substrate.

In further another aspect of the optical sensor unit, each of the radio optical sensor means is provided on a spherical substrate and adapted to photograph an image in all directions.

In further another aspect of the optical sensor unit, the radio optical sensor means includes a plurality of position/direction detection elements for detecting positional information of the radio optical sensor means and directional information with respect to the subject and conducting communication to the radio elements, which are provided at different angles with respect to the subject; the radio optical sensor means communicates to the radio communication means photographed image information, the positional information, and the directional information to the subject; and the radio communication means synthesizes images of the subject from the respective information and displays the synthesized image.

In further another aspect of the optical sensor unit, the radio optical sensor means communicates information of light sensitivity to one another to optimize exposure.

In further another aspect of the optical sensor unit, the radio elements have different values with respect to at least one of an inductance and a capacitance for each radio element, and the radio communication means transmits an electromagnetic wave having a different frequency to access each of the radio elements.

In further another aspect of the optical sensor unit, a digital modulation method selected from the group consisting of amplitude modulation, frequency modulation, and phase modulation is used as a method of imparting an instruction of a transmission request for the photographing information from the radio communication means to each of the radio elements.

In further another aspect of the optical sensor unit, the optical sensor includes a solid-state image pickup element composed of a CCD sensor or a CMOS sensor, and a lens.

According to another aspect of the present invention, an optical sensor array includes a plurality of radio optical sensor means each including an optical sensor and a radio element for transmitting and receiving of an information though communication with the optical sensor to and from an outside by radio, and in the optical sensor array, an electromagnetic wave as a signal for requesting transmission of photographing information and an electromagnetic wave for supplying energy for photographing by the optical sensor and radio transmission and reception by the radio elements are received from the outside, and photographing information of a subject from the optical sensor is transmitted to the outside through the radio element.

In further another aspect of the optical sensor array, each of the radio optical sensor means is provided on a curved substrate and adapted to photograph the subject at different angles.

In further another aspect of the optical sensor array, each of the radio optical sensor means is provided on a cylindrical substrate and adapted to photograph a 360° image along a circumference of a cross section of the substrate.

In further another aspect of the optical sensor array, each of the radio optical sensor means is provided on a spherical substrate and adapted to photograph an image in all directions.

In further another aspect of the optical sensor array, the optical sensor array further includes a plurality of position/direction detection elements for detecting positional information of the radio optical sensor means and directional information with respect to the subject and conducting communication to the radio elements, which are provided at different angles with respect to the subject, photographed image information, the positional information, and the directional information to the subject being transmitted to the outside.

In further another aspect of the optical sensor array, the radio optical sensor means communicate information of light sensitivity to one another to optimize exposure.

In further another aspect of the optical sensor array, the radio elements have different values with respect to at least one of an inductance and a capacitance for each radio element, and receive electromagnetic waves having different frequencies from the outside.

In further another aspect of the optical sensor array, the optical sensor includes a solid-state image pickup element composed of a CCD sensor or a CMOS sensor, and a lens.

According to another aspect of the present invention, a method of driving an optical sensor includes: arranging a plurality of radio optical sensor means independently of one another, which each include an optical sensor and a radio element for transmitting and receiving of an information through communication with the optical sensor to and from an outside by radio; arranging radio communication means for transmitting and receiving an electromagnetic wave as a radio signal to and from the radio elements in a region apart from the radio elements; transmitting from the radio communication means to each of the radio elements an electromagnetic wave as a signal for requesting transmission of photographing information and an electromagnetic wave for supplying energy for photographing by the optical sensor and radio transmission and reception by the radio elements; and receiving from each of the radio optical sensor means the electromagnetic waves and transmitting the photographing information of a subject from the optical sensor to the radio communication means through the radio element.

In further another aspect of the method of driving an optical sensor, each of the radio optical sensor means is provided on a curved substrate and adapted to photograph the subject at different angles.

In further another aspect of the method of driving an optical sensor, each of the radio optical sensor means is provided on a cylindrical substrate and adapted to photograph a 360° image along a circumference of a cross section of the substrate.

In further another aspect of the method of driving an optical sensor, each of the radio optical sensor means is provided on a spherical substrate and adapted to photograph an image in all directions.

In further another aspect of the method of driving an optical sensor, the method further includes: arranging in the radio optical sensor means a plurality of position/direction detection elements for detecting positional information of the radio optical sensor means and directional information with respect to the subject and conducting communication to the radio elements, which are provided at different angles with respect to the subject; transmitting from the radio optical sensor means photographed image information, the positional information, and the directional information to the subject to the radio communication means; and synthesizing by the radio communication means images of the subject from the respective information to display the synthesized image.

In further another aspect of the method of driving an optical sensor, the radio optical sensor means communicate information of light sensitivity to one another to optimize exposure.

In further another aspect of the method of driving an optical sensor, the radio elements have different values with respect to at least one of an inductance and a capacitance for each radio element, to thereby cause the radio communication means to transmit an electromagnetic wave having a different frequency to access each of the radio elements.

In further another aspect of the method of driving an optical sensor, a digital modulation method selected from the group consisting of amplitude modulation, frequency modulation, and phase modulation is used as a method of imparting an instruction of a transmission request for the photographing information from the radio communication means to each of the radio elements.

Thus, according to findings by the inventor of the present invention, in view of the above-mentioned problems, a large number of optical sensor elements are separately arranged and radio waves are transmitted to the respective optical sensor elements to drive them, so that respective wirings can be omitted and the optical sensor elements can be separately arranged. Because the respective elements are thus separated, the optical sensor can be arranged on an arbitrary curved body. Therefore, it is not required that photographing is conducted many times from different directions and then obtained images are synthesized.

Also, a single subject can be photographed from different directions and an image of wide angle from 180° to 360° can be photographed from a single location. In addition, because each of the radio optical sensor sections has a communication function, communication is conducted among them, so that the light sensitivity can be adjusted and a single image can be formed as a whole.

DESCRIPTION OF THE PREFERRED EMBODIMENTS

Hereinafter, description will be made of optical sensor units as embodiments for explaining the present invention with reference to the drawings.

First Embodiment

Figure 1:
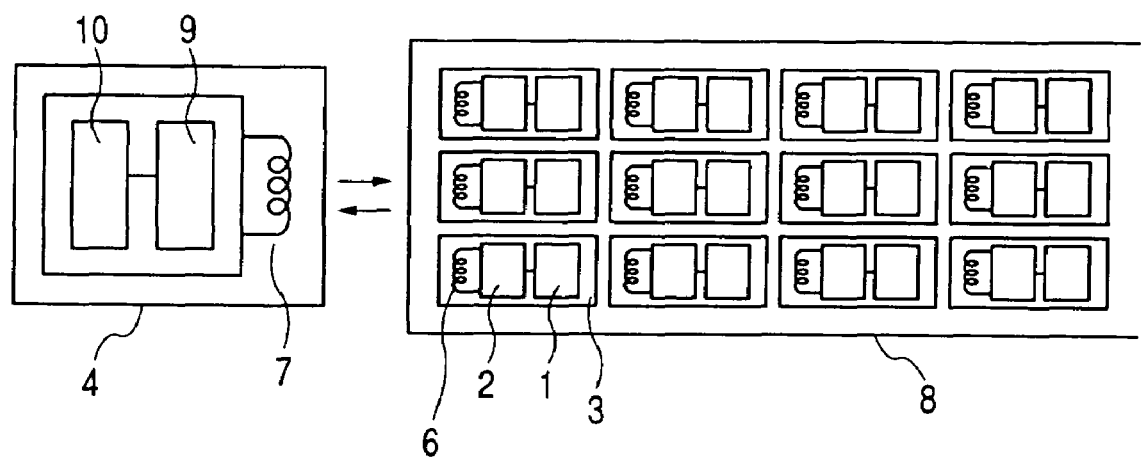
FIG. 1 shows an example of a circuit structure of a radio optical sensor unit of the present invention.

FIG. 1 is a schematic diagram showing a rough structure of an optical sensor unit according to a first embodiment of the present invention.

An optical sensor unit of this embodiment is composed of an image pickup area section 8 composing an optical sensor array in which a large number of radio optical sensors 3 are arranged and a radio communication means 4 located in the vicinity thereof. In the case of the image pickup area section 8 shown in FIG. 1, for example, 3×4 radio optical sensors are arranged. However, it is sufficient that plural radio optical sensors are arranged and the number thereof is not limited to the example shown in FIG. 1.

The radio communication means 4 has an image data signal circuit 10, a radio transmission circuit 9 connected therewith, and an antenna 7. When an image pickup command is outputted from an external control device which is not shown in the drawing, the image data signal circuit 10 receives information at this timing, converts it into a format corresponding to the structure of the image pickup area section 8, and then sends the converted information to the radio transmission circuit 9. The radio transmission circuit 9 transmits image pickup timing information and energy required for image pickup as electromagnetic waves to the image pickup area section 8 through the antenna 7.

Each of the radio optical sensors 3 is composed of an optical sensor element 1, a radio element 2, and an antenna 6. Information transmitted from the antenna 7 of the radio communication means is received in the radio element 2 through the antenna 6. This information is sent to the optical sensor element 1. The image forming elements, which have received the ON information, forms an image which is displayed on the entirety of an image display section.

Hereinafter, an image pickup process will be briefly described.

First, a command for signal reply request is sent from the radio communication means to the respective radio elements. Upon reception of the command, the radio elements instruct an optical sensor section to output image pickup signals, and the optical sensor elements send pixel information through the radio elements to the radio communication means. The radio communication means receives the information from the respective optical sensor elements.

Figure 2:
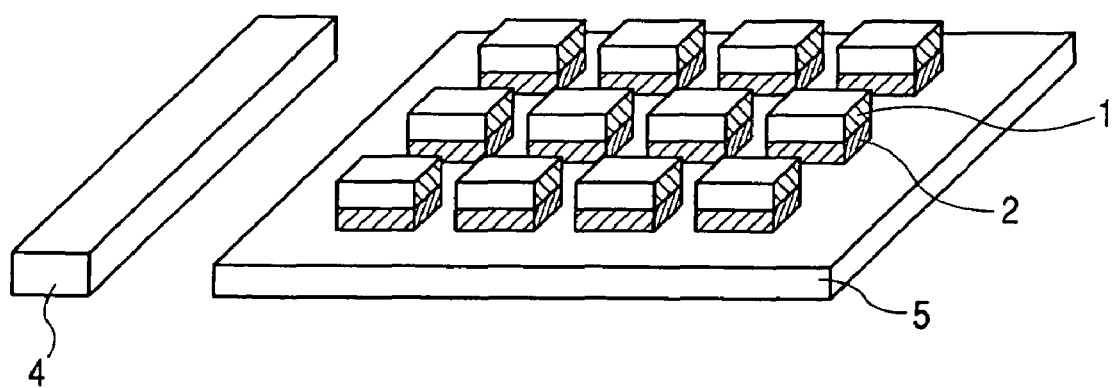
FIG. 2 shows an example of a structure of the radio optical sensor unit of the present invention.
Figure 3:
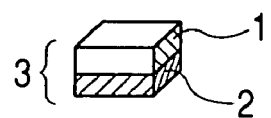
FIG. 3 shows a radio optical sensor of the present invention.

FIG. 2 is a perspective view showing a structural example of the radio optical sensor unit of the present invention. A large number of radio optical sensors 3, each of which is a laminate of the radio element 2 and the optical sensor element 1 as shown in FIG. 3, are arranged on a substrate 5. In addition, the radio communication means 4 is provided in the vicinity of the radio optical sensors.

Figure 4:
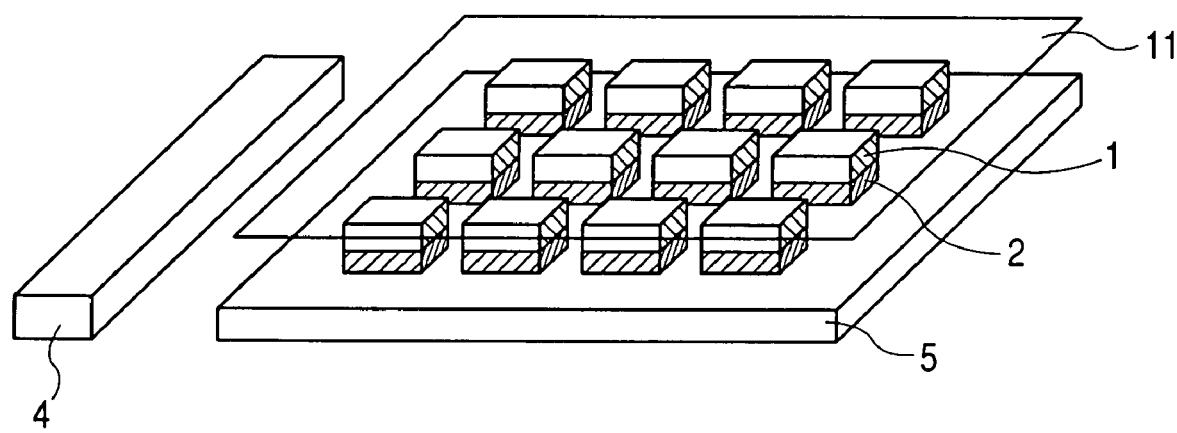
FIG. 4 shows an example of a structure of the radio optical sensor unit of the present invention.

As shown in FIG. 4, an image generated from the optical sensor elements 1 may be changed into a color image by providing a color filter 11 of R (red), G (green), and B (blue).

Also, the antenna of the radio communication means and that of the radio element may be a coil shape as shown in FIG. 1 or a flat plate shape such as a shape of a dipole antenna, and a selection therebetween is made according to a frequency, a distance, and the like.

Second Embodiment

In the optical sensor unit of the first embodiment as shown in FIGS. 1 and 2, electromagnetic waves or magnetic fields which are transmitted from the radio communication means 4 are simultaneously received in the plural radio optical sensors 3. Several methods may be given as a method of communicating with the radio optical sensors.

For example, there is the case where the respective radio elements have different inductances or different capacitances from one another. A resonance frequency fc is indicated using an inductance L and a capacitance C by the following expression (1).

$$fc=1/(2\pi(LC)^{1/2}) \quad (1)$$

Therefore, it is set such that the respective radio elements have different resonance frequencies from one another, and radio waves with the set resonance frequencies are sent from the radio communication means 4 to elements for which image formation is required. Thus, photographing becomes possible and an arbitrary image can be formed as a whole.

Also, a digital modulation method such as amplitude modulation, frequency modulation, or phase modulation may be used. According to those methods, a carrier wave with a constant frequency is sent and one of three parameters of power, a frequency, and a phase in the carrier wave is changed to transmit information. Energy required for image pickup by the optical sensor elements can be sent using the carrier wave.

Figure 5:
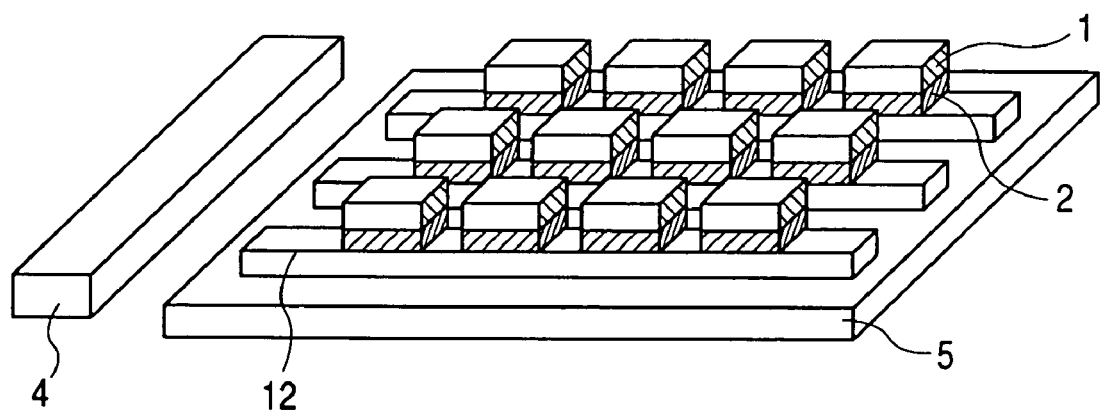
FIG. 5 shows an example of a structure of a radio optical sensor unit of the present invention.

Also, the energy used for image pickup may be supplied through energy supply wirings 12 as shown in FIG. 5 and only ON/OFF information for the optical sensor elements may be transmitted by radio. This is effective, for example, in the case where energy supplied using an electromagnetic wave is insufficient for image pickup operation of the optical sensor elements.

Third Embodiment

Figure 6:
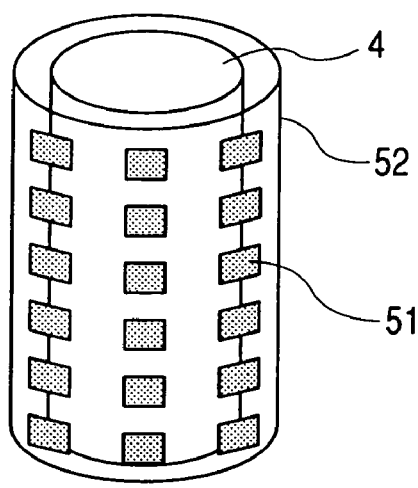
FIG. 6 shows an example of a structure of a radio optical sensor unit of the present invention.

FIG. 6 shows a structural example of an optical sensor unit of this embodiment.

Radio optical sensors 51 are provided on a cylindrical substrate 52. In addition, a columnar radio communication means 4 is provided in the inner portion of the substrate, so that communication with the respective radio optical sensors can be conducted. The radio optical sensors are evenly arranged around the cylindrical substrate. Therefore, a 360-degrees image can be photographed.

Figure 7:
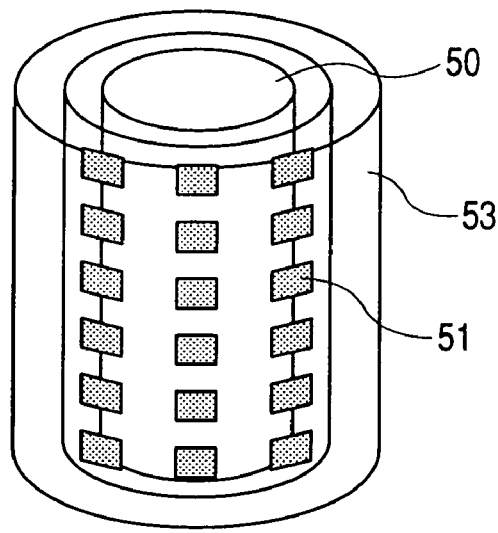
FIG. 7 shows an example of a structure of the radio optical sensor unit of the present invention.
Figure 11:
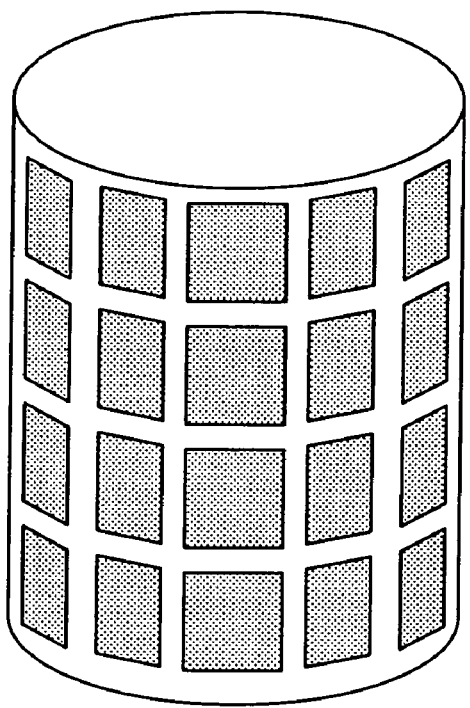
FIG. 11 shows an example of a structure of the radio optical sensor unit of the present invention.
Figure 12:
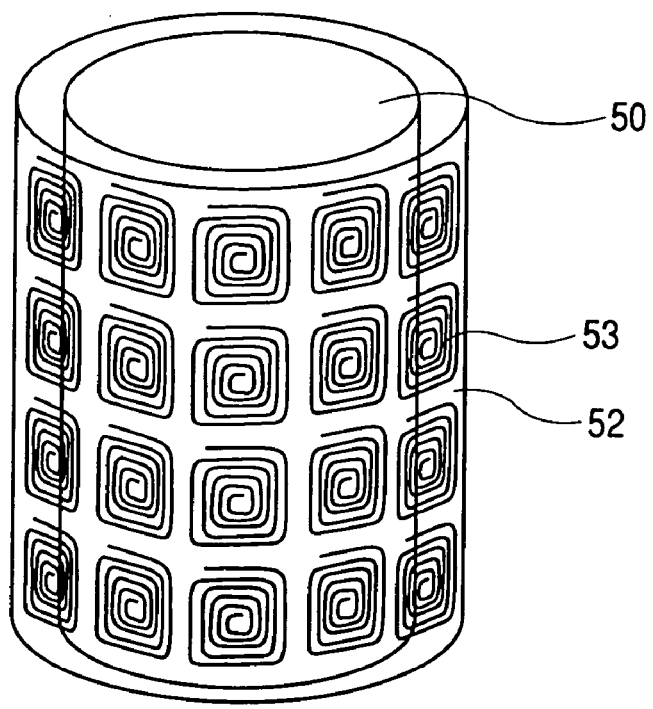
FIG. 12 shows an example of a structure of the radio optical sensor unit of the present invention.

FIG. 7 shows the case where a lens structure 53 is provided to the optical sensor unit shown in FIG. 6. FIGS. 11 and 12 show examples of antenna structures.

Fourth Embodiment

Figure 8:
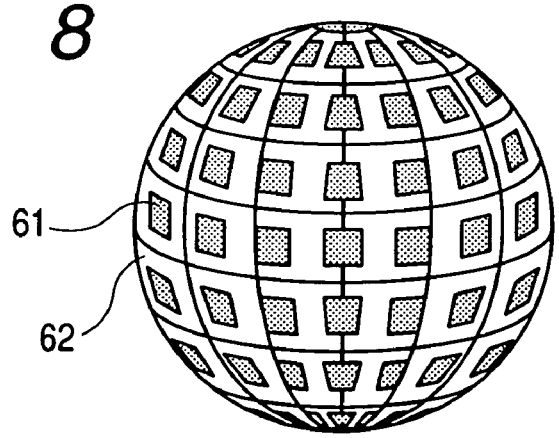
FIG. 8 shows an example of a structure of a radio optical sensor unit of the present invention.

FIG. 8 shows a structural example of an optical sensor unit of this embodiment. Radio optical sensors 61 are laid on the entire surface of a spherical substrate 62. A radio communication means 4 which is not shown is provided in the inner portion of the spherical substrate 62, so that communication with the respective radio optical sensors 61 can be conducted. In addition, although not shown, the radio communication means communicates with an external control device such as a personal computer.

Figure 9:
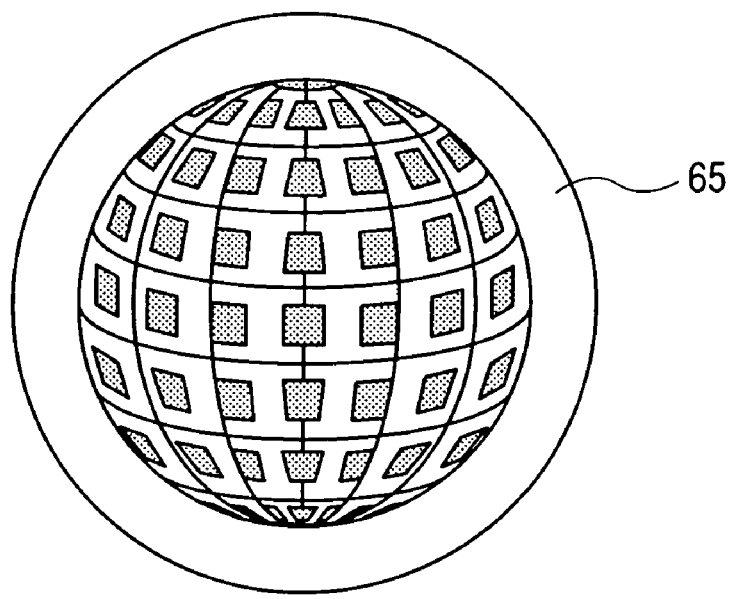
FIG. 9 shows an example of a structure of the radio optical sensor unit of the present invention.

FIG. 9 is a schematic view showing a state in which a lens structure 65 is located outside of the optical sensor unit shown in FIG. 8.

Figure 10:
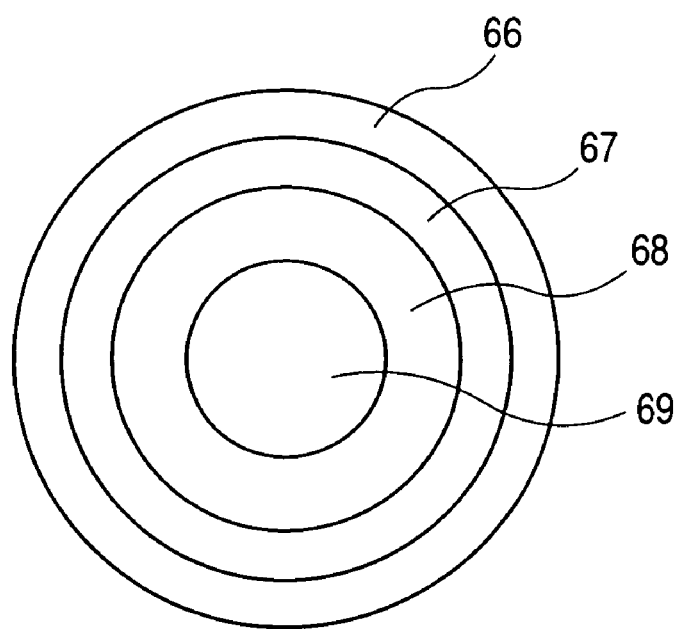
FIG. 10 shows an example of a structure of the radio optical sensor unit of the present invention.

This structure may be obtained by laying micro-lenses. Alternatively, as shown in FIG. 10, light may be condensed to a structure 68 in which radio optical sensors are laid through lens films 66 and 67 having different refraction indexes. In the figure, reference numeral 69 denotes a radio communication means.

Fifth Embodiment

Figure 13:
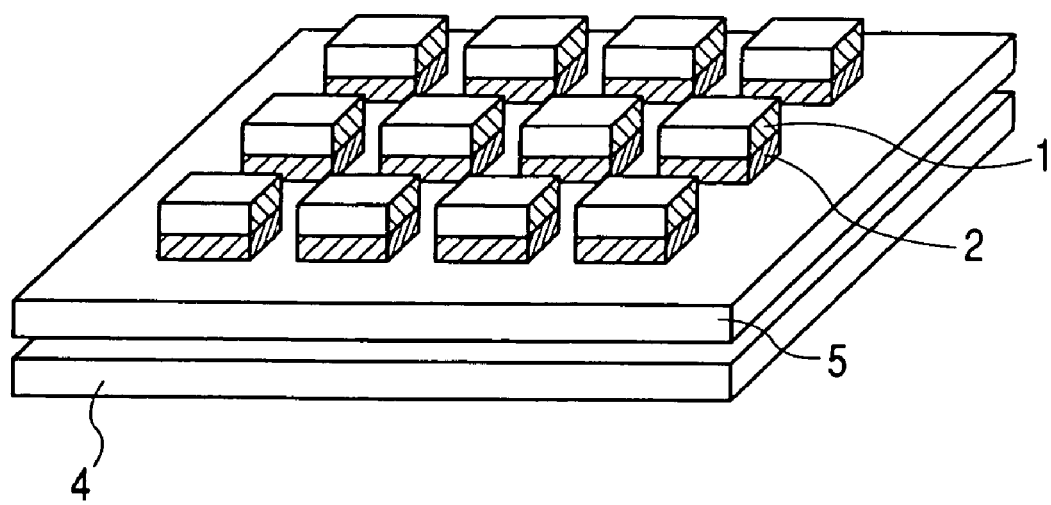
FIG. 13 shows an example of a structure of a radio optical sensor unit of the present invention.

As shown in FIG. 13, a radio communication means 4 may be provided in the lower side of a substrate 5. Therefore, distances between the radio communication means 4 and respective radio image forming elements are made uniform. In addition, because distances therebetween become shorter, there are the following advantages. That is, when radio transmission is conducted for the respective elements, sufficient energy can be transmitted thereto, ON information can be transmitted without fail, etc.

Figure 14:
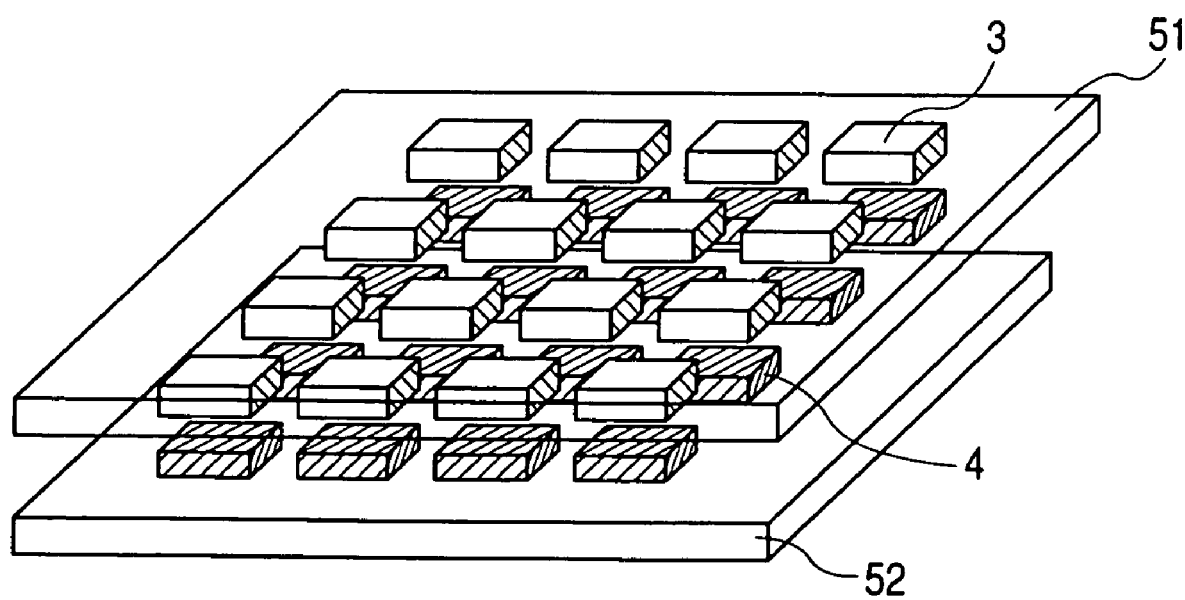
FIG. 14 shows an example of a structure of the radio optical sensor unit of the present invention.

Also, as shown in FIG. 14, radio image forming elements 3 arranged on a transparent substrate 51 may be opposed to radio communication means 4 arranged on a substrate 52 so as to make each of the elements and each of the sections correspond to each other. In this case, a so-called spatial time-division multiplexing system in which distances between the radio communication means and radio image forming elements become shorter and separate communication can be spatially conducted for the respective elements can be used. Accordingly, interferences among the elements can be efficiently suppressed.

Figure 15:
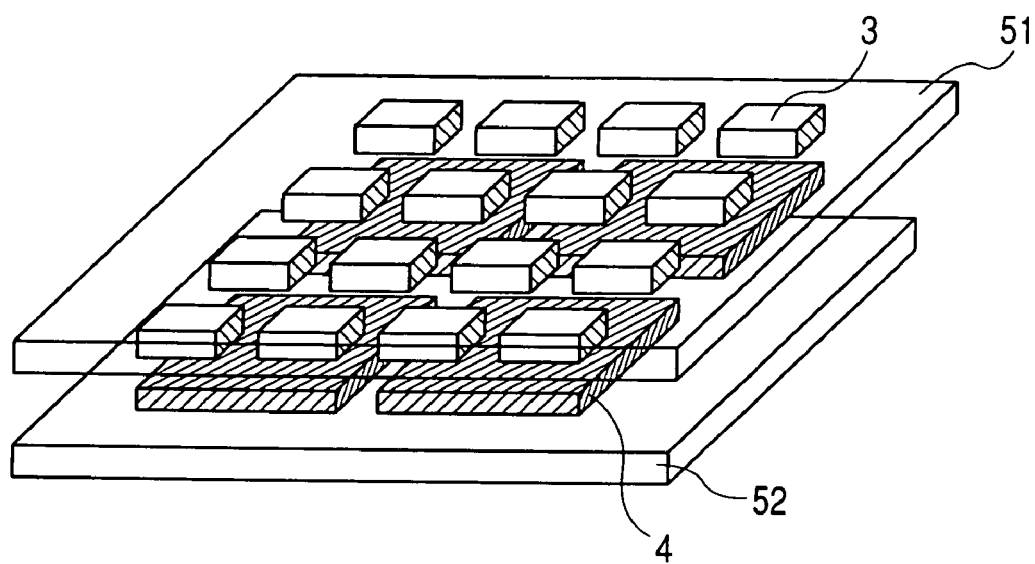
FIG. 15 shows an example of a structure of the radio optical sensor unit of the present invention.
Figure 16:
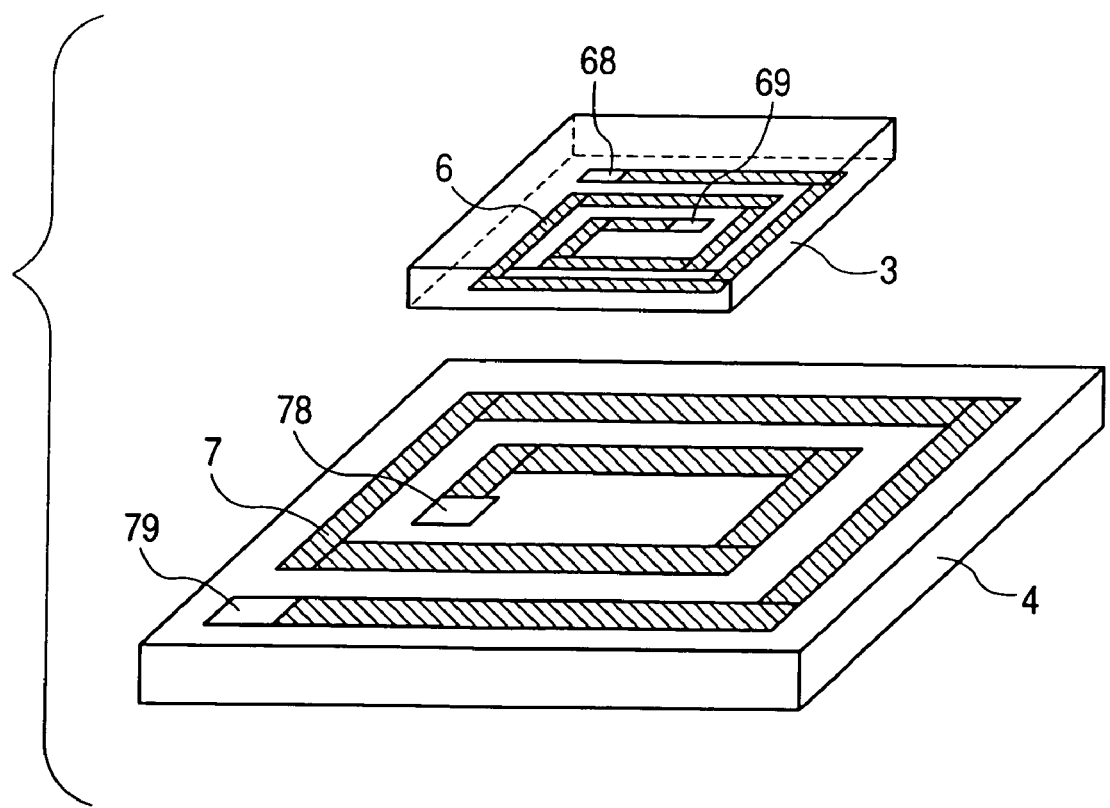
FIG. 16 shows an example of a structure of the radio optical sensor unit of the present invention.

Also, the radio optical sensor unit shown in FIG. 14 may be improved to provide one radio communication means 4 for plural image forming elements 3, for example, four radio image forming elements 3 as shown in FIG. 15. Accordingly, a structure is further simplified. FIG. 16 shows a structure of an antenna taken out with respect to FIG. 15. An antenna 6 of the radio image forming element 3 is a spiral shape. A current flows according to a change in magnetic field, thereby generating a voltage between terminals 68 and 69. The radio communication means 4 has the same structure as the radio image forming element. A high frequency current is made to flow between terminals 78 and 79 of a spiral antenna 7, thereby providing a generated magnetic field to the radio image forming element 3.

Sixth Embodiment

Figure 17A:
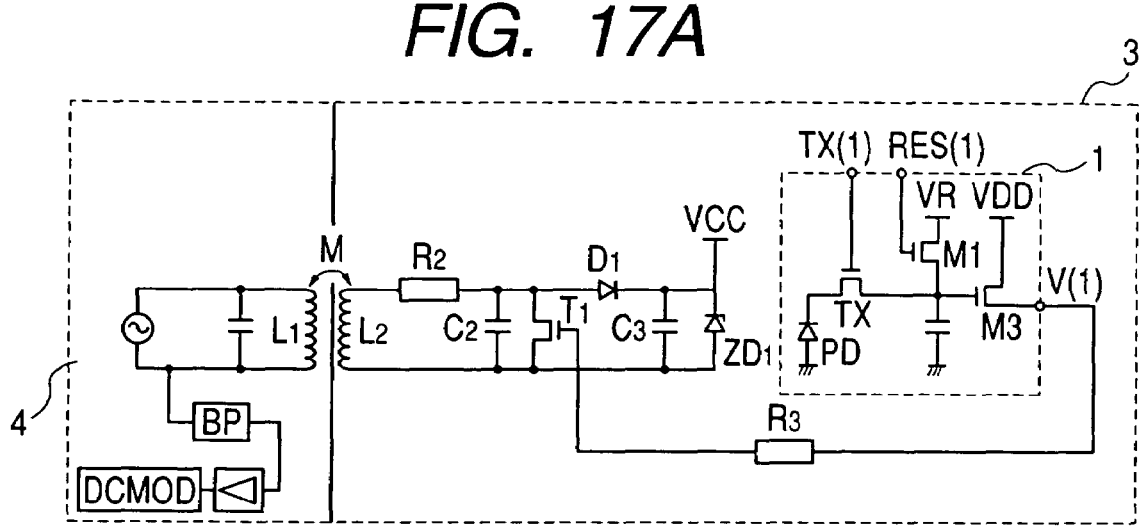
FIGS. 17A and 17B show examples of circuit structures of a radio optical sensor unit of the present invention.

FIG. 17A is a circuit diagram showing a circuit corresponding to the structure shown in FIG. 14.

As shown in FIG. 17A, an antenna 7 of a radio communication means 4 is a coil with an inductance L1 and an antenna 6 of a radio image forming element 3 is a coil with an inductance L2. The coils with inductances L1 and L2 are not physically in contact with each other and are magnetically coupled by a mutual inductance M. A resistance of the coil with the inductance L2 is indicated by R2.

A capacitor C2 is connected in parallel with the coil with the inductance L2 and set such that it is resonated at a frequency of a radio wave transmitted from the antenna 7. An optical sensor element 1 located in a region surrounded by a dotted line is connected in parallel with the capacitor. A diode D1 is located between the capacitor and the optical sensor element. Therefore, the polarity of alternating current is made single. Further, a low direct current voltage Vcc is produced by a Zener diode ZD1. This voltage is applied to necessary portions of the optical sensor element. In FIG. 17A, an example in which a CCD sensor is used as the optical sensor element is indicated.

Hereinafter, an operation example of the CCD sensor will be described. Before reading signal charges from a photo diode PD, a potential Φ(RES1 to the gate of a reset MOS M1 is set to a high level. Therefore, the gate of an amplifying MOS M3 is reset to VR.

Next, a potential ΦTX1 to the gate of a charge transfer switch TX becomes a high level, so that the photo signal charges from the photo diode PD are transferred to the gate of the amplifying MOS M3. Accordingly, a current corresponding to charges resulting from light detected by the photo diode is produced in V(1).

The current is inputted to the gate of a transistor T1 through a resistor R3, so that a resistance between the source and the drain of the transistor T1 located in parallel to the coil with the inductance L2 is changed. Accordingly, an amplitude of an electromagnetic wave sent from the coil with the inductance L2 to the radio communication means 4 is changed, thereby transmitting image pickup data to the ratio communication section.

Note that, as shown in FIG. 17A, a voltage in VR connected with the drain electrode of the charge transfer switch TX and a voltage in VDD connected with the drain electrode of the amplifying MOS M3 are supplied from the above-mentioned Vcc. In addition, similarly, ΦTX1 and ΦRES1 are supplied from Vcc. With respect to a timing of supply, circuit elements may be inserted between Vcc and TX1 and between Vcc and RES1 so as to produce a time difference.

Therefore, a radio wave is transmitted from the radio communication means 4 to the radio optical sensor according to a timing of photographing, so that a radio wave whose amplitude is modulated according to the amount of light received in the photo diode PD can be returned to the radio communication means.

Figure 17B:
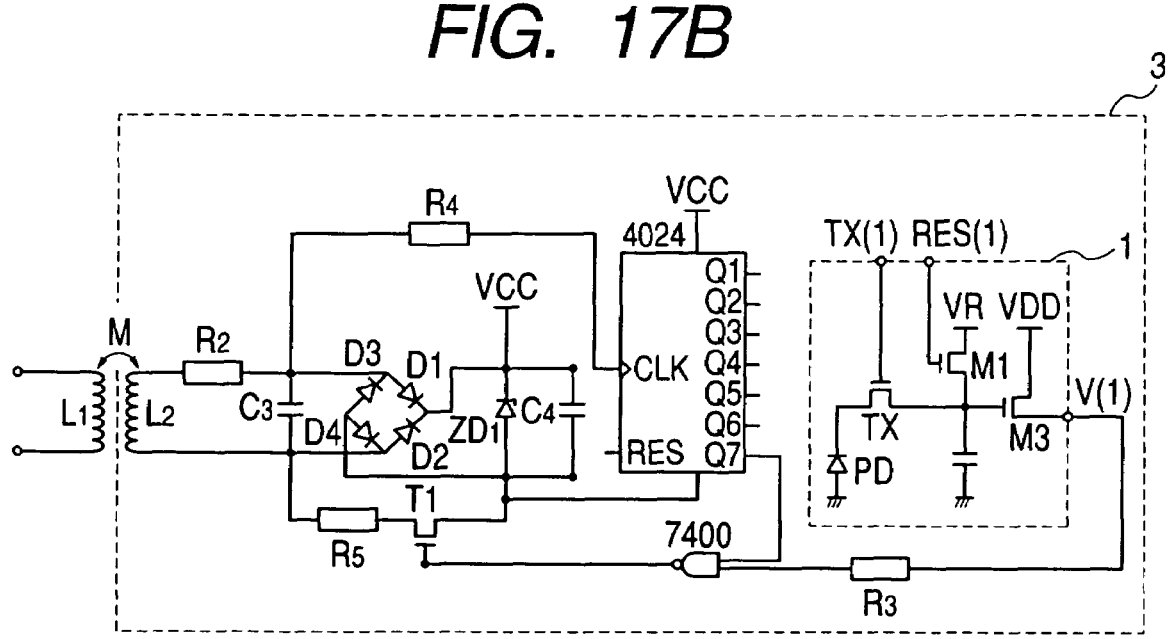

Also, FIG. 17B shows a circuit structure showing an example in which the circuit shown in FIG. 17A is improved.

In this case, a sub-carrier with a low frequency is produced from a transmitting frequency by a multi-stage binary counter 4024. For example, a sub-carrier with 212 kHz is produced from a transmitting frequency of 13.56 MHz. A voltage induced in the antenna coil with the inductance L2 is rectified using a bridge rectifier (D1 to D4) and then smoothed, so that it is used as power supplied to the circuit. In addition, a signal corresponding to the voltage induced in the antenna coil is passed through a protective resistor R4, so that it is used for a generating source for an internal clock signal. For example, in the case of FIG. 17B, the signal is divided into the sixth power of 2 (=64) and then a clock signal of the sub-carrier with 212 kHz is generated from Q7. On the other hand, an output signal V(1) from the optical sensor element 1 passes through a processing portion R3, processed using the sub-carrier by a NAND gate 7400, and arrived at a gate electrode of a transistor T1, and then the output signal V(1) modulated by T1 passes through a load resistor R5, and is transmitted from the antenna coil with the inductance L2. When the sub-carrier is used as in the case of the circuit shown in FIG. 17B, communication is improved.

Seventh Embodiment

Figure 18:
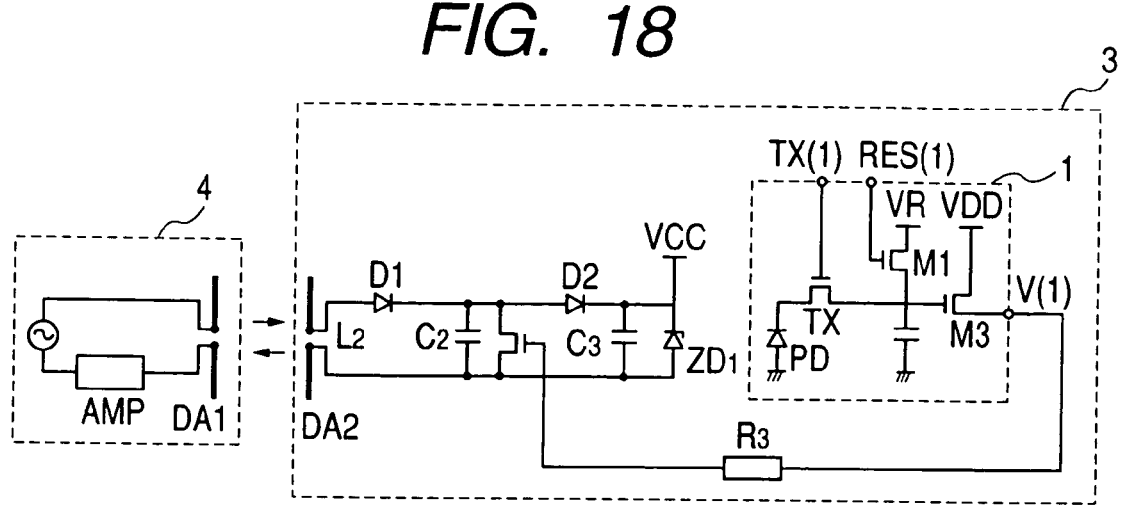
FIG. 18 shows an example of a circuit structure of a radio optical sensor unit of the present invention.

The example of the communication mode using inductive coupling is described in the sixth embodiment. However, electromagnetic backscatter coupling may be used. FIG. 18 shows this example. In this case, an antenna of a radio communication means 4 and an antenna of a radio optical sensor 3 are a dipole antenna DA1 and a dipole antenna DA2, respectively. When the wave length λ of a communication radio wave is used, the communication distance is longer than a value indicated by λ/(2π). It is preferable that a length of the antenna is set to λ/2. Alternatively, it is preferable that an end portion of the antenna is grounded and the length thereof is set to λ/4. Therefore, the resonance can be made at a transmitting frequency to conduct the communication.

Eighth Embodiment

Figure 19:
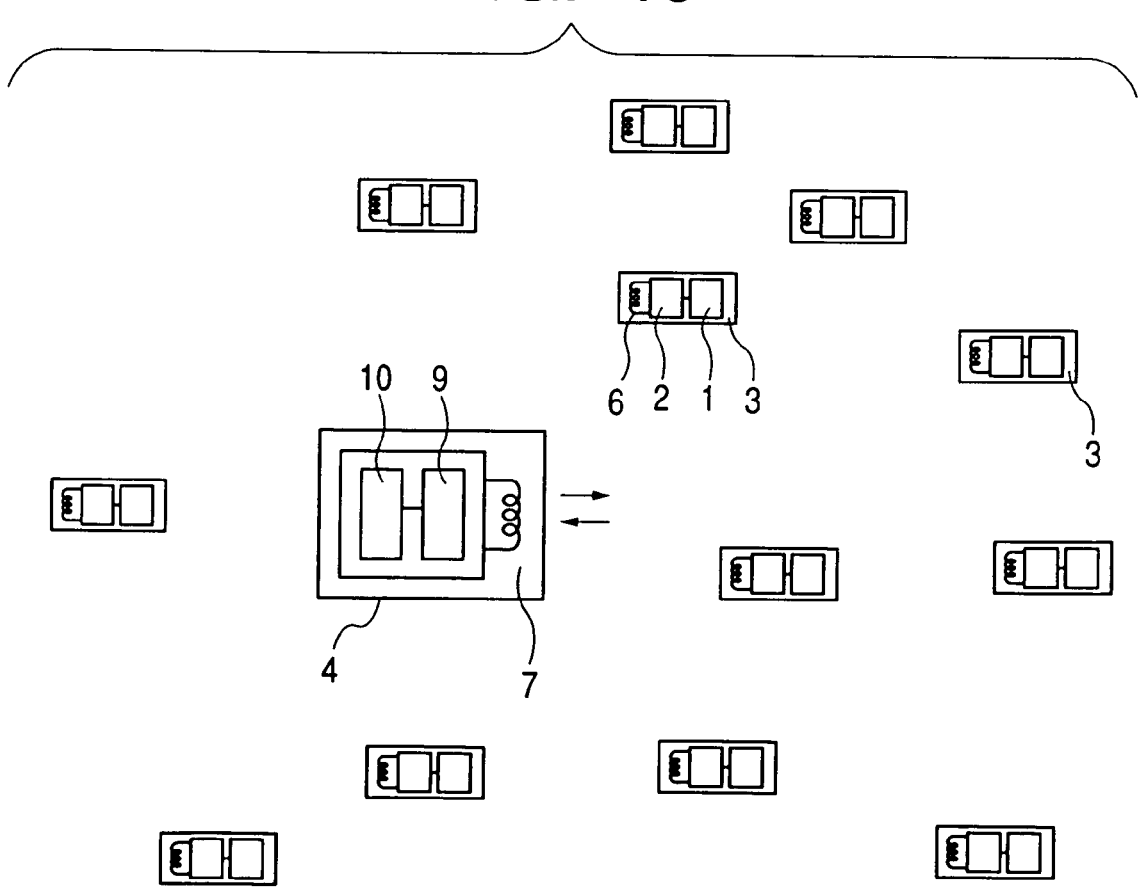
FIG. 19 shows an example of a structure of a radio optical sensor unit of the present invention.

FIG. 19 shows an optical sensor unit of this embodiment. There are a large number of radio optical sensors 3 which are located at random. Radio communication is conducted for each of them and an image photographed by a radio optical sensor of the respective radio optical sensors is sent to a radio communication means 4.

Figure 20:
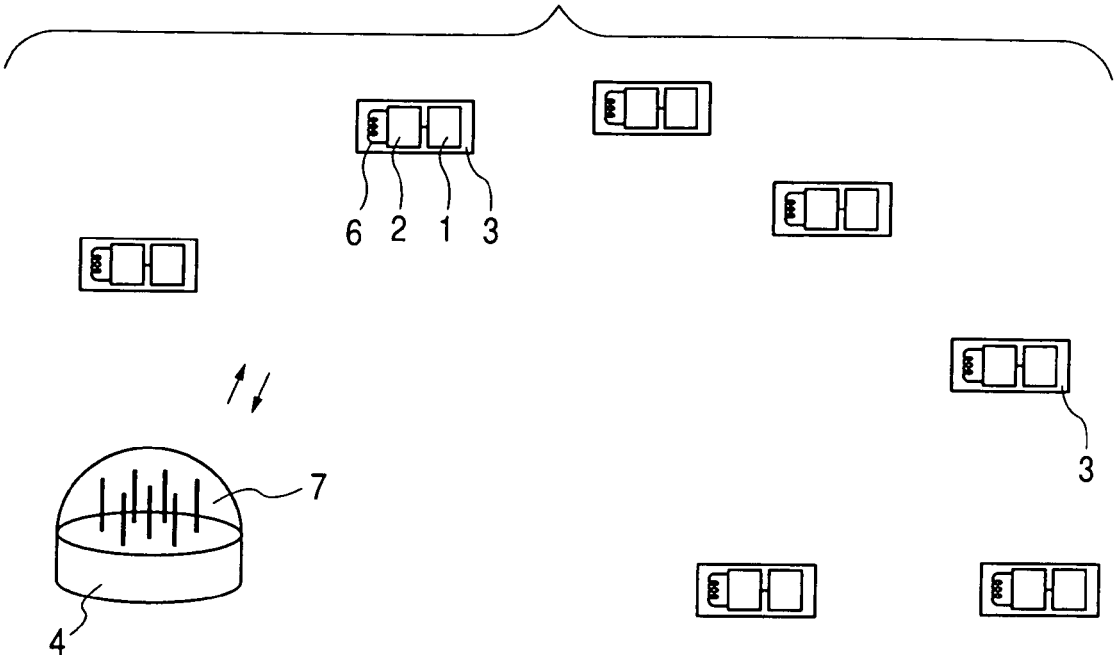
FIG. 20 shows an example of a structure of the radio optical sensor unit of the present invention.

FIG. 20 shows an optical sensor unit in which the antenna of the radio communication means 4 is improved and which has directivity.

Ninth Embodiment

Figure 21:
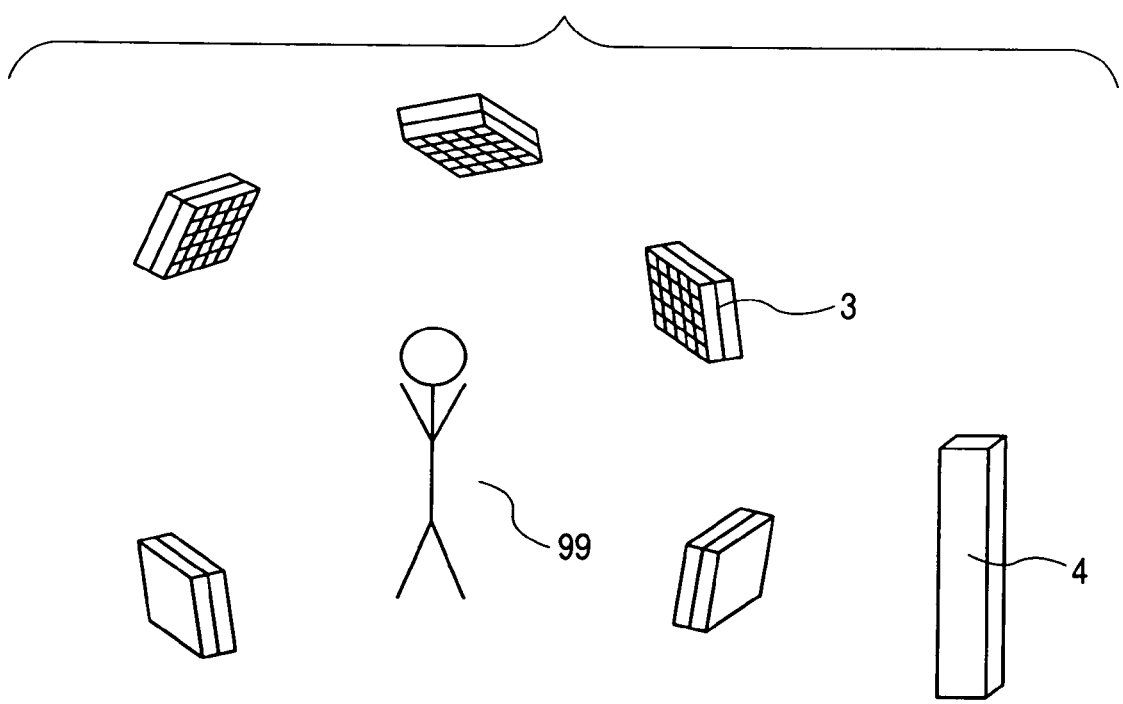
FIG. 21 shows an example of a structure of a radio optical sensor unit of the present invention.

FIG. 21 shows an embodiment of an optical sensor unit of the present invention. Radio optical sensors 3 of the present invention are located around an image pickup object 99. The plurality of radio optical sensors are located at different angles with respect to the object, and photographed image data are outputted from the elements to be sent to a radio communication means 4.

Further, an element for sensing positional information of the radio optical sensor and directional information with respect to the object is provided in each of the radio optical sensors. Accordingly, photographed image information, positional information, and directional information with respect to the object which are outputted from each of the radio optical sensors can be transmitted to the radio communication means. Thus, it is possible that images of the object are synthesized based on those information by the radio communication means and a synthesized image is displayed.

Tenth Embodiment

Figure 22:
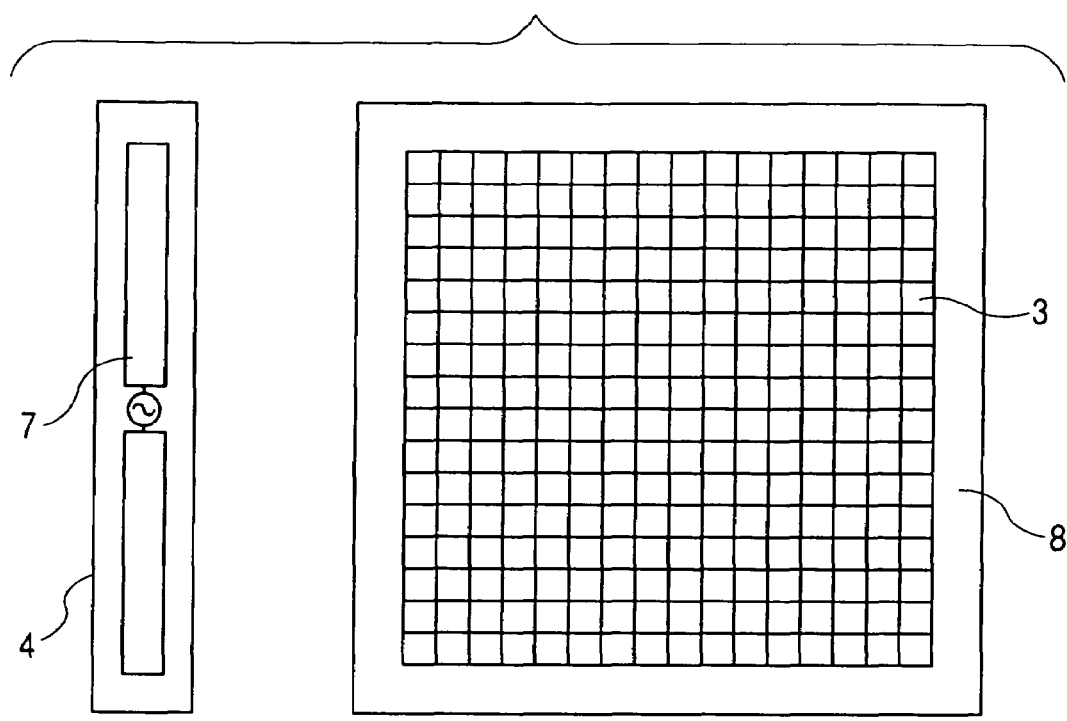
FIG. 22 shows an example of a structure of a radio optical sensor unit of the present invention.
Figure 23:
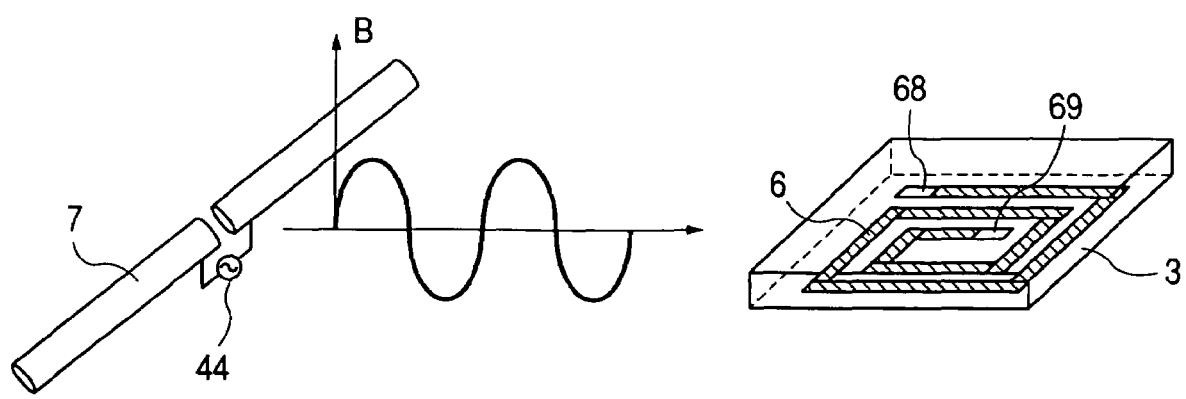
FIG. 23 shows an example of a relationship among an antenna of a radio transmission section, a generated magnetic field, and a radio optical sensor in the radio optical sensor unit of the present invention.
Figure 24:
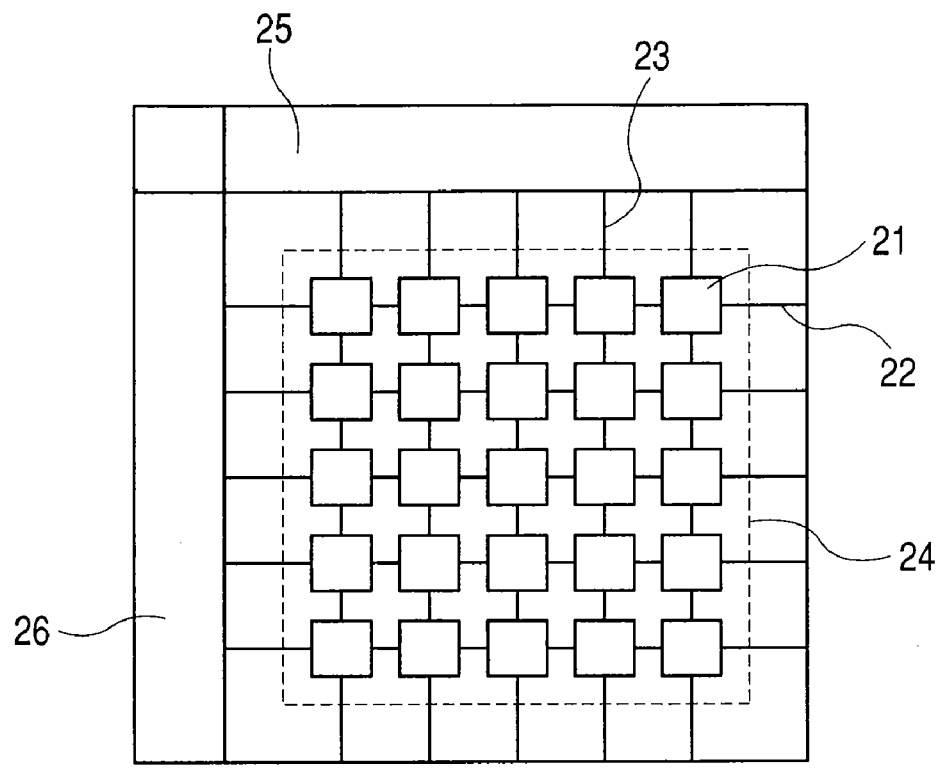
FIG. 24 shows a circuit structure of a conventional optical sensor.
Figure 25:
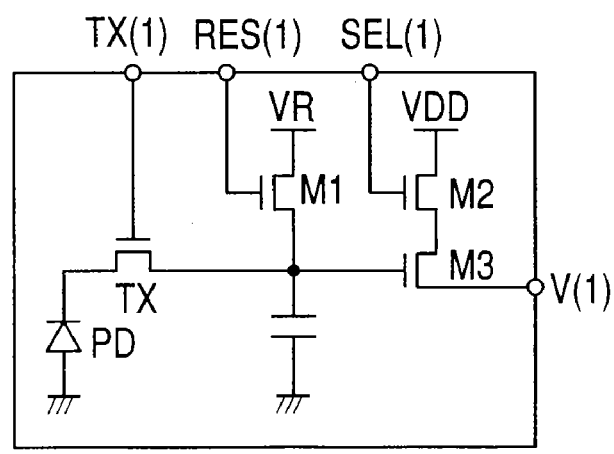
FIG. 25 shows a circuit structure of a conventional optical sensor.

As shown in FIGS. 22 and 23, according to an example in which a dipole antenna 7 is used in a radio communication means 4, a high frequency signal 44 is applied to the dipole antenna and a generated magnetic field B is supplied to a radio optical sensor 3. Because, an antenna 6 of the radio optical sensor is placed on a surface parallel to the dipole antenna 7, induced electromotive force is generated in the antenna 6 according to a variation in generated magnetic field B. When the induced electromotive force is led from terminals 68 and 69, an image can be formed by the radio optical sensor. Therefore, a sensor section 8 can have an image pickup function to the entire region. For example, a high frequency signal of 2.45 GHz is used as the high frequency signal 44 and a length of the antenna 7 is set to 5 cm to 6 cm corresponding to half the wavelength.

According to the present invention, there is provided: an optical sensor unit with high reliability in which the respective optical sensor elements are provided on a curved surface without using wirings to prevent a reduction in image pickup speed due to wiring delay to achieve improvement in terms of the image pickup speed, whereby highly sensitive photographing is possible; an optical sensor array of the optical sensor unit; and a method of driving an optical sensor in the optical sensor unit.

What is claimed is:

1. An optical sensor unit comprising:
   a plurality of radio optical sensor means each including an optical sensor and a radio element for transmitting and receiving of an information through communication with the optical sensor to and from an outside by radio; and
   radio communication means for transmitting and receiving an electromagnetic wave as a radio signal to and from the radio elements, which is located in a region apart from the radio elements, wherein:
   the radio communication means transmits to each of the radio elements an electromagnetic wave as a signal for requesting transmission of photographing information and an electromagnetic wave for supplying energy for photographing by the optical sensor and radio transmission and reception by the radio elements; and
   each of the radio optical sensor means receives the electromagnetic waves and transmits photographing information of a subject from the optical sensor to the radio communication means through the radio element.

2. An optical sensor unit according to claim 1, wherein each of the radio optical sensor means is provided on a curved substrate and adapted to photograph the subject at different angles.

3. An optical sensor unit according to claim 2, wherein each of the radio optical sensor means is provided on a cylindrical substrate and adapted to photograph a 360° image along a circumference of a cross section of the substrate.

4. An optical sensor unit according to claim 2, wherein each of the radio optical sensor means is provided on a spherical substrate and adapted to photograph an image in all directions.

5. An optical sensor unit according to claim 1, further comprising a plurality of position/direction detection elements for detecting positional information of the radio optical sensor means and directional information with respect to the subject and conducting communication to the radio elements, which are provided at different angles with respect to the subject, photographed image information, the positional information, and the directional information to the subject being transmitted to the radio communication means,
   wherein the radio communication means synthesizes images of the subject from the respective information and displays the synthesized image.

6. An optical sensor unit according to claim 1, wherein the radio optical sensor means communicate information of light sensitivity to one another to optimize exposure.

7. An optical sensor unit according to claim 1, wherein:
   the radio elements have different values with respect to at least one of an inductance and a capacitance for each radio element; and
   the radio communication means transmits an electromagnetic wave having a different frequency to access each of the radio elements.

8. An optical sensor unit according to claim 1, wherein a digital modulation method selected from the group consisting of amplitude modulation, frequency modulation, and phase modulation is used as a method of imparting an instruction of a transmission request for the photographing information from the radio communication means to each of the radio elements.

9. An optical sensor array comprising:
   a plurality of radio optical sensor means each including an optical sensor and a radio element for transmitting and receiving of an information through communication with the optical sensor to and from an outside by radio,
   wherein an electromagnetic wave as a signal for requesting transmission of photographing information and an electromagnetic wave for supplying energy for photographing by the optical sensor and radio transmission and reception by the radio elements are received from the outside, and photographing information of a subject from the optical sensor is transmitted to the outside through the radio element.

10. A method of driving an optical sensor comprising:
    arranging a plurality of radio optical sensor means independently of one another, which each include an optical sensor and a radio element for transmitting and receiving of an information through communication with the optical sensor to and from an outside by radio;
    arranging radio communication means for transmitting and receiving an electromagnetic wave as a radio signal to and from the radio elements in a region apart from the radio elements;
    transmitting from the radio communication means to each of the radio elements an electromagnetic wave as a signal for requesting transmission of photographing information and an electromagnetic wave for supplying energy for photographing by the optical sensor and radio transmission and reception by the radio elements; and
    receiving from each of the radio optical sensor means the electromagnetic waves and transmitting the photographing information of a subject from the optical sensor to the radio communication means through the radio element.

11. A method of driving an optical sensor according to claim 10, further comprising:
    arranging in the radio optical sensor means a plurality of position/direction detection elements for detecting positional information of the radio optical sensor means and directional information with respect to the subject and conducting communication to the radio elements, which are provided at different angles with respect to the subject;
    transmitting from the radio optical sensor means photographed image information, the positional information, and the directional information to the subject to the radio communication means; and
    synthesizing by the radio communication means images of the subject from the respective information to display the synthesized image.

* * * * *